(12) United States Patent
Suzuki et al.

(10) Patent No.: US 9,812,119 B2
(45) Date of Patent: Nov. 7, 2017

(54) VOICE SELECTION SUPPORTING DEVICE, VOICE SELECTION METHOD, AND COMPUTER-READABLE RECORDING MEDIUM

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventors: Masaru Suzuki, Kanagawa (JP); Kaoru Hirano, Tokyo (JP)

(73) Assignees: KABUSHIKI KAISHA TOSHIBA, Tokyo (JP); TOSHIBA SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 15/066,007

(22) Filed: Mar. 10, 2016

(65) Prior Publication Data
US 2016/0189704 A1   Jun. 30, 2016

Related U.S. Application Data (63) Continuation of application No. PCT/JP2013/075581, filed on Sep. 20, 2013.

(51) Int. Cl.
| | |
|---|---|
| G10L 13/00 | (2006.01) |
| G10L 13/027 | (2013.01) |
| G10L 13/10 | (2013.01) |
| G06F 17/27 | (2006.01) |
| G10L 13/04 | (2013.01) |

(52) U.S. Cl.
CPC ......... *G10L 13/027* (2013.01); *G06F 17/278* (2013.01); *G06F 17/2755* (2013.01); *G10L 13/043* (2013.01); *G10L 13/10* (2013.01)

(58) Field of Classification Search
CPC ....... G10L 13/027; G10L 13/00; G10L 13/02; G10L 13/033; G10L 13/08; G10L 13/10;
(Continued)

(56) References Cited

U.S. PATENT DOCUMENTS

| | | | |
|---|---|---|---|
| 9,483,461 B2* | 11/2016 | Fleizach | G10L 13/033 |
| 2005/0080626 A1* | 4/2005 | Marumoto | G10L 13/02 |
| | | | 704/269 |

(Continued)

FOREIGN PATENT DOCUMENTS

| | | |
|---|---|---|
| JP | 02-247696 | 10/1990 |
| JP | 2000-214874 | 8/2000 |

(Continued)

OTHER PUBLICATIONS

International Search Report for International Patent Application No. PCT/JP2013/075581 dated Dec. 17, 2013, 4 pages.

(Continued)

*Primary Examiner* — Qi Han
(74) *Attorney, Agent, or Firm* — Amin, Turocy & Watson LLP (57) ABSTRACT

A voice selection supporting device according to an embodiment of the present invention includes an acceptance unit that accepts input of a text, an analysis knowledge storage unit that stores therein text analysis knowledge to be used for characteristic analysis for the input text, an analysis unit that analyzes a characteristic of the text by referring to the text analysis knowledge, a voice attribute storage unit that stores therein a voice attribute of each voice dictionary, an evaluation unit that evaluates similarity between the voice attribute of the voice dictionary and the characteristic of the text, and a candidate presentation unit that presents, based on the similarity, a candidate for the voice dictionary suitable for the text.

6 Claims, 9 Drawing Sheets

(58) Field of Classification Search
CPC ............ G10L 2013/00; G10L 2013/02; G10L 2013/08; G10L 2013/10
USPC ......................... 704/260, 258, 266, 263, 268
See application file for complete search history.

(56) References Cited

U.S. PATENT DOCUMENTS

| | | |
|---|---|---|
| 2009/0150157 A1* | 6/2009 | Kagoshima ............. G10L 13/08 704/260 |
| 2012/0221339 A1* | 8/2012 | Wang ...................... G10L 13/08 704/260 |
| 2012/0239390 A1 | 9/2012 | Fume et al. |
| 2013/0080160 A1 | 3/2013 | Fume et al. |

FOREIGN PATENT DOCUMENTS

| | | |
|---|---|---|
| JP | 2004-362419 | 12/2004 |
| JP | 2009-139390 | 6/2009 |
| JP | 2009-217846 | 9/2009 |
| JP | 2012-198277 | 10/2012 |
| JP | 2013-072957 | 4/2013 |
| JP | 2013-080362 | 5/2013 |

OTHER PUBLICATIONS

Written Opinion for International Patent Application No. PCT/JP2013/075581 dated Dec. 17, 2013, 3 pages.

\* cited by examiner

FIG.2

| | | Speaker A | Speaker B | Speaker C | Speaker D | Speaker E | Speaker F | ... |
|---|---|---|---|---|---|---|---|---|
| Speaker's Name | | Speaker A | Speaker B | Speaker C | Speaker D | Speaker E | Speaker F | ... |
| Gender | | M | F | M | F | M | M | ... |
| Age Group | | Y | M | C | Y | H | Y | ... |
| Type | | C | H | K | M | G | C | ... |
| Style | Reading (desu/masu) | 20 | 40 | 30 | 10 | 20 | 10 | ... |
| | Reading (dearu) | 10 | 10 | 0 | 0 | 50 | 20 | ... |
| | Conversation (formal) | 45 | 30 | 30 | 30 | 30 | 25 | ... |
| | Conversation (frank) | 25 | 20 | 40 | 60 | 0 | 45 | ... |
| Form | Novel | 30 | 30 | 0 | 10 | 30 | 10 | ... |
| | Textbook | 20 | 0 | 0 | 10 | 20 | 0 | ... |
| | E-mail | 10 | 10 | 40 | 30 | 10 | 40 | ... |
| | Conversation | 10 | 20 | 40 | 40 | 10 | 40 | ... |
| | Announcement | 30 | 40 | 20 | 10 | 30 | 10 | ... |
| Characteristic | | TECHNOLOGY, IT, COSMOS, DEVELOPMENT, BIOTECHNOLOGY, ... | TICKET GATE, KONZATSU (CONGESTION), COCKTAIL, E-MAIL, ... | SCHOOL, SCIENCE, MOM, QUIZ, FRIEND, ... | KAWAII (PRETTY), PART-TIME JOB, DREAM, PRESENT, ... | TRIP, PHOTO, LONG-ESTABLISHED STORE, HON (BOOK), TRAIN, ... | DESIGN, FASHION, SENSE, ... | ... |

201 — Speaker A column
203 — Speaker B column
202 — Speaker F column

| PATTERN | ATTRIBUTE | WEIGHT | |
|---|---|---|---|
| +DESU <AUXILIARY VERB>+. <PERIOD> | READING (DESU/MASU) | 1 | ~401 |
| +DEARU <AUXILIARY VERB> | READING (DESU/MASU) | 1 | ~402 |
| +DESU <AUXILIARY VERB><br>+NE <POSTPOSITION> | CONVERSATION (FORMAL) | 1 | |
| +DESHOU <AUXILIARY VERB><br>+KA <POSTPOSITION> | CONVERSATION (FORMAL) | 1 | |
| +DA <AUXILIARY VERB>+YO <POSTPOSITION><br>+NE <POSTPOSITION> | CONVERSATION (FRANK) | 1 | |
| <PERSON'S NAME (FIRST NAME)><br>+WA <POSTPOSITION> | NOVEL | 1 | ~403 |
| +TE <POSTPOSITION><br>+MIMASHOU <AUXILIARY VERB>+. <PERIOD> | TEXTBOOK | 1 | |
| OSEWA <NOUN>+NI <POSTPOSITION>/<br>NARI <VERB>+MASU <AUXILIARY VERB> | E-MAL<br>CONVERSATION | 0.8<br>0.2 | |
| ARE <NOUN>+TTE <POSTPOSITION> | E-MAL<br>CONVERSATION | 0.4<br>0.6 | |
| GOCHUI <NOUN>+KUDASAI <AUXILIARY VERB> | ANNOUNCEMENT | 1 | |
| ⋮ | ⋮ | ⋮ | |

| Speaker's Name | Gender | Age Group | Type | STYLE | | | | FORM | | | | | Characteristic |
|---|---|---|---|---|---|---|---|---|---|---|---|---|---|
| | | | | Reading (desu/masu) | Reading (deru) | Conversation (formal) | Conversation (frank) | Novel | Textbook | E-mail | Conversation | Announcement | |
| Speaker A | M | Y | C | 20 | 10 | 45 | 25 | 30 | 20 | 10 | 10 | 30 | technology, IT, cosmos, development, biotechnology, … |
| Speaker B | F | M | H | 40 | 10 | 30 | 20 | 30 | 0 | 10 | 20 | 40 | ticket gate, konzatsu (congestion), cocktail, e-mail, … |
| Speaker C | M | C | K | 30 | 0 | 30 | 40 | 0 | 0 | 40 | 40 | 20 | school, science, mom, quiz, friend, … |
| Speaker D | F | Y | M | 10 | -100 | 30 | 60 | 10 | 10 | 30 | 40 | 10 | kawaii (pretty), part-time job, dream, present, … |
| Speaker E | M | H | G | 20 | 50 | 30 | 0 | 30 | 20 | 10 | 10 | 30 | trip, photo, long-established store, hon (book), train, … |
| Speaker F | M | Y | C | 10 | 20 | 25 | 45 | 10 | 0 | 40 | 40 | 10 | -ore, fashion, sense, … |
| … | | | | | | | | | | | | | … |

| | | KEYWORD → | KONZATSU (CONGESTION), SHOTEN (BOOKSTORE), OKU (REAR), MIOBOE (FAMILIAR), HON (BOOK) [801] | BAKUHU (HISTORICAL MILITARY GOVERNMENT IN JAPAN), EDO (OLD NAME OF TOKYO), TOWN, ... | CAFÉ, SHIBUYA, ... | TODAY, VISIT TO STORE, GUIDE, ... [802] | ... |
|---|---|---|---|---|---|---|---|
| STYLE | READING (DESU/MASU) | | 100 | 10 | 10 | 60 | ... |
| | READING (DEARU) | | 0 | 60 | 0 | 10 | ... |
| | CONVERSATION (FORMAL) | | 0 | 30 | 30 | 30 | ... |
| | CONVERSATION (FRANK) | | 0 | 0 | 60 | 0 | ... |
| FORM | NOVEL | | 100 | 80 | 30 | 30 | ... |
| | TEXTBOOK | | 0 | 20 | 0 | 0 | ... |
| | E-MAIL | | 0 | 0 | 30 | 10 | ... |
| | CONVERSATION | | 0 | 0 | 40 | 20 | ... |
| | ANNOUNCEMENT | | 0 | 0 | 0 | 40 | ... |
| SELECTION RESULT | | | SPEAKER B | SPEAKER G | SPEAKER Z | SPEAKER B | ... |

VOICE SELECTION SUPPORTING DEVICE, VOICE SELECTION METHOD, AND COMPUTER-READABLE RECORDING MEDIUM

CROSS-REFERENCE TO RELATED APPLICATION(S)

This application is a continuation of International Application No. PCT/JP2013/075581, filed on Sep. 20, 2013, the entire contents of which are incorporated herein by reference.

FIELD

Embodiments described herein relate generally to a voice selection supporting device, a voice selection method, and a computer-readable recording medium.

BACKGROUND

When utilizing voice synthesis, it is necessary to listen to actual voices in order to select a speaker (voice dictionary). It is therefore difficult to select the speaker from among a large number of candidates. In the selection of the speaker which has been provided conventionally, there have been no more than about 10 kinds of options for the speaker. In recent years, however, 800 or more kinds of voice dictionaries have been provided. Therefore, a means to designate an attribute (e.g. gender, age group, attribute (cool/husky/moe, which means "extremely adorable" in Japanese)) to search for a speaker has been provided as a means to select a speaker. In another technique, when a voice dictionary of a speaker designated by metadata of a text does not exist in a reproduction environment, an alternative voice is selected based on an attribute (same as the above-mentioned attribute) described in the metadata, and the selected voice is reproduced.

In a method to designate an attribute to search for a speaker, however, it is difficult for a user to appropriately set an attribute of a speaker suitable for reading an input text. In a case where there are a large number of voice dictionaries, and many candidates for the speaker are presented even as the result of the attribute search, it might be difficult to narrow down these candidates.

In order to solve the above-mentioned problems and achieve an object, an embodiment of the present invention includes: an acceptance unit that accepts input of a text; an analysis knowledge storage unit that stores therein text analysis knowledge to be used for characteristic analysis for the input text; an analysis unit that analyzes a characteristic of the text by referring to the text analysis knowledge; a voice attribute storage unit that stores therein a voice attribute of each voice dictionary; an evaluation unit that evaluates similarity between the voice attribute of the voice dictionary and the characteristic of the text; and a candidate presentation unit that presents, based on the similarity, a candidate for the voice dictionary suitable for the text.

DETAILED DESCRIPTION

Hereinafter, an embodiment of the present invention will be described with reference to the accompanying drawings.

First Embodiment

Figure 1:
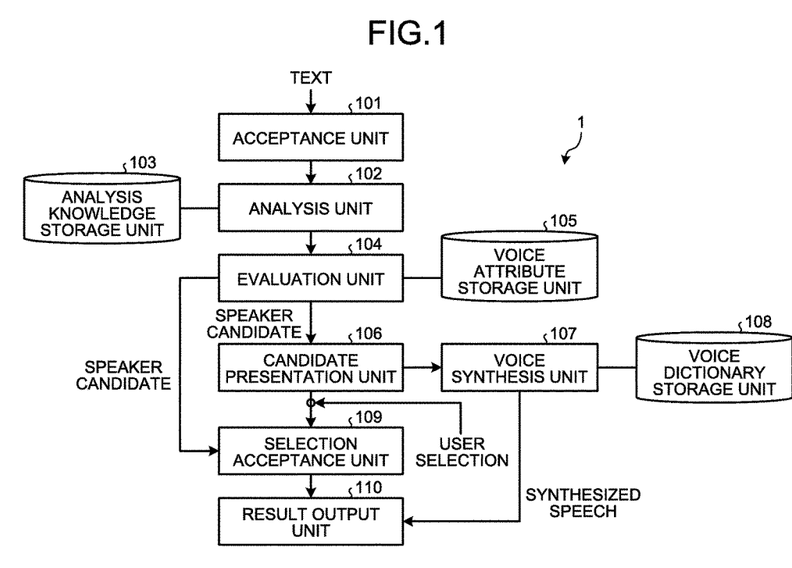
FIG. 1 is a block diagram illustrating a functional configuration of a voice selection supporting device according to an embodiment.

A first embodiment will describe a voice selection supporting device capable of, in response to input of a text document, presenting, from among a plurality of voice dictionaries of speakers, a candidate for a voice dictionary to be used for reading in a synthesized voice. FIG. 1 is a block diagram illustrating a functional configuration of a voice selection supporting device 1 according to the present embodiment. The voice selection supporting device 1 includes an acceptance unit 101, an analysis unit 102, an evaluation unit 104, a candidate presentation unit 106, a selection acceptance unit 109, a result output unit 110, a voice synthesis unit 107, an analysis knowledge storage unit 103, a voice attribute storage unit 105, and a voice dictionary storage unit 108. Each of these components may be realized by software, or by hardware such as an electronic circuit.

The acceptance unit 101 accepts, from a user, input of a text to be read in voice synthesis. The analysis unit 102 analyzes the text accepted by the acceptance unit 101 from the user while referring to text analysis knowledge stored in the analysis knowledge storage unit 103. The text analysis knowledge will be described in detail below.

The evaluation unit 104 evaluates a voice attribute indicating a vocal characteristic of each speaker for the voice synthesis by comparing the voice attribute stored in the voice attribute storage unit 105 with an analysis result of the analysis unit 102. The evaluation unit 104 also selects a candidate for a speaker suitable for reading the input text in the voice synthesis. The candidate presentation unit 106 presents, to the user, information of one or more speakers selected by the evaluation unit 104. In this case, all or a part of the input text may be subjected to the voice synthesis using the voice synthesis unit 107 by switching from the voice dictionary storage unit 108 to the voice dictionary corresponding to each speaker.

The selection acceptance unit 109 accepts a selection of the speaker decided by the user, from among the speakers presented by the candidate presentation unit 106, to be the most suitable for reading the input text. The result output unit 110 presents, to the user, a result of the decision by the user accepted by the selection acceptance unit 109.

Figure 2:
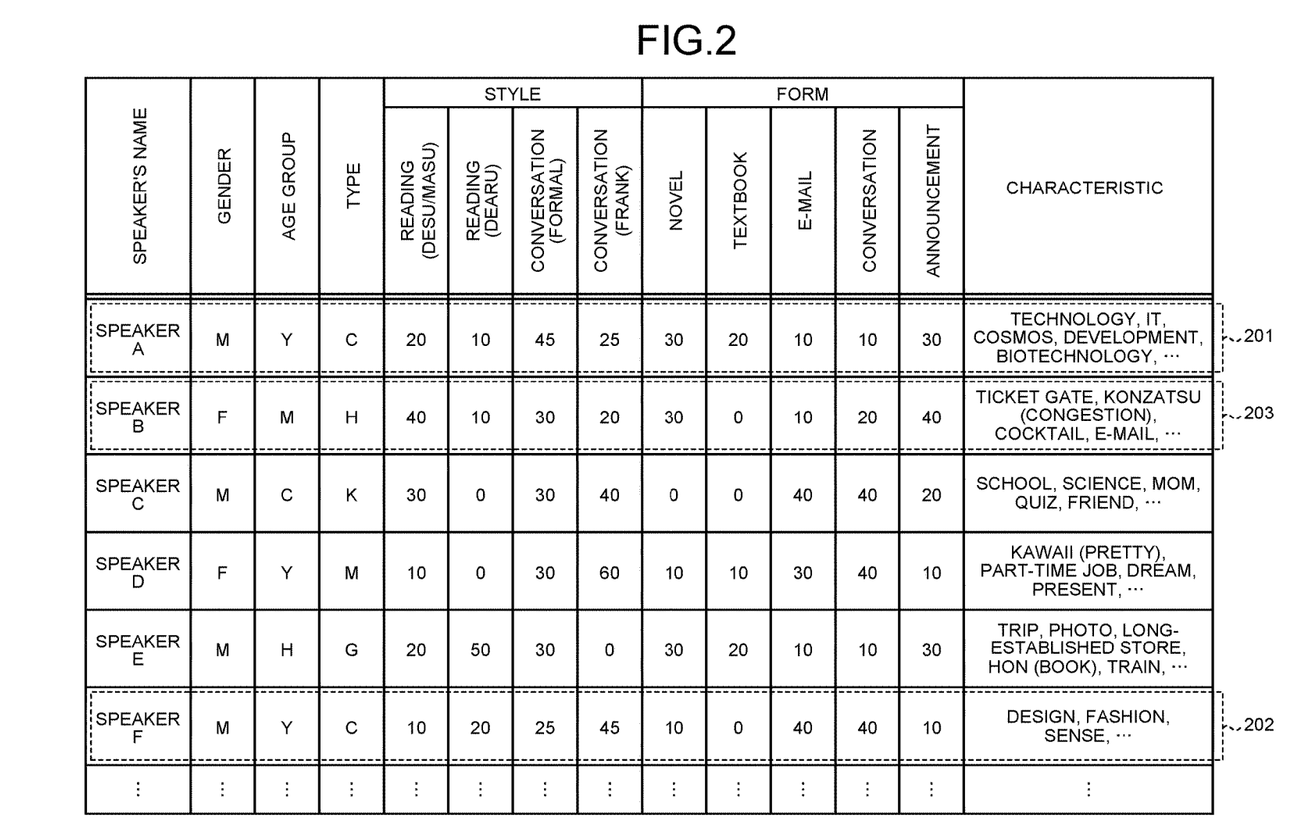
FIG. 2 is a diagram illustrating exemplary voice attributes according to the embodiment.

Next, the voice attribute will be described using FIG. 2. The voice attribute is stored in the voice attribute storage unit 105 and indicates the vocal characteristic of each speaker for the voice synthesis. Exemplary voice attributes stored in the voice attribute storage unit 105 are illustrated in FIG. 2. As illustrated in FIG. 2, the voice attributes are each represented by items such as gender, age group, type, style, form, and characteristic. The style is represented in terms of reading (desu/masu), reading (dearu), conversation (formal), and conversation (frank). (In this regard, "desu/masu" is a style of polite speech in Japanese, and "dearu" is a style of assertive speech in Japanese.) The form is represented in terms of novel, textbook, e-mail, conversation, and announcement. The characteristic is represented as a list of words that are characteristic of a sentence suitable for being read by each speaker.

The gender, age group, and type of each speaker are indicated by signals. Specifically, the gender is indicated by M (male)/F (female), the age group is indicated by C (child)/Y (youth)/M (maturity)/H (higher age), and the type is indicated by C (cool)/H (husky)/K (kawaii, which means "pretty" in Japanese)/M (moe)/G (gentle). The style and the form are indicated by values so that the sum of the values in each item is equal to 100.

For example, it is illustrated by 201 of FIG. 2 that 201 is a cool voice of a young man, relatively suited for a formal conversational style, and also suited for the forms such as the novel and the announcement. Regarding the characteristic, 201 is considered to be relatively suited for scientific and technological subjects. On the other hand, it is illustrated by 202 of FIG. 2 that 202 is similar to 201 in terms of a cool voice of a young man, but 202 is suited for a frank conversational style, and also suited for the forms such as the e-mail and the conversation. Regarding the characteristic, 202 is considered to be suited for relatively casual subjects such as design and fashion.

As mentioned above, voices of the same gender, age group, and type might be different from each other in the style, form, or suitability for subjects. Each speaker may set such a voice attribute by him/herself for explaining features of his/her voice. If the speaker is, for example, a narrator or a voice actor, a sentence group previously read in his/her own real voice may be processed and analyzed, as will be described later, by the analysis unit 102, and used as the voice attribute. Alternatively, words and phrases that are characteristic of the sentence group may be listed according to frequency of the words and phrases included in the sentence groups, and used as the voice attribute.

The kinds of perspectives and the methods for representing the respective perspectives in FIG. 2 are examples for explaining the present embodiment specifically, and the content of the present invention is not limited to these kinds or representation methods. The voice attributes of only six speakers are illustrated in FIG. 2 for explanation purposes. In practice, however, the voice attributes of much more speakers are stored in the voice attribute storage unit 105.

Although the voice attribute is labeled as "speaker's name", each voice attribute and voice dictionary does not necessarily need to correspond to a specific person. The voice attribute or the voice dictionary of a non-existent person may be created by combining voices of a plurality of persons, or by changing the voice dictionary of a certain person. Alternatively, the same person may change a tone of his/her voice so that a plurality of voice attributes or voice dictionaries is associated with the single speaker.

Next, an operation according to the present embodiment will be described based on an example in which the user causes a speaker to read a sentence "Hanako wa konzatsu o sake shoten no oku de matta. (omitted) Mioboe no aru hon dearu." This sentence means "Hanako, avoiding the crowd, waited in the rear of the bookstore. (omitted) It is a familiar book." This sentence is an example modeled after a portion of a novel. It is expected in practice that a whole novel is input. For explanation purposes, however, only a portion will be examined herein as an example.

Figure 3:
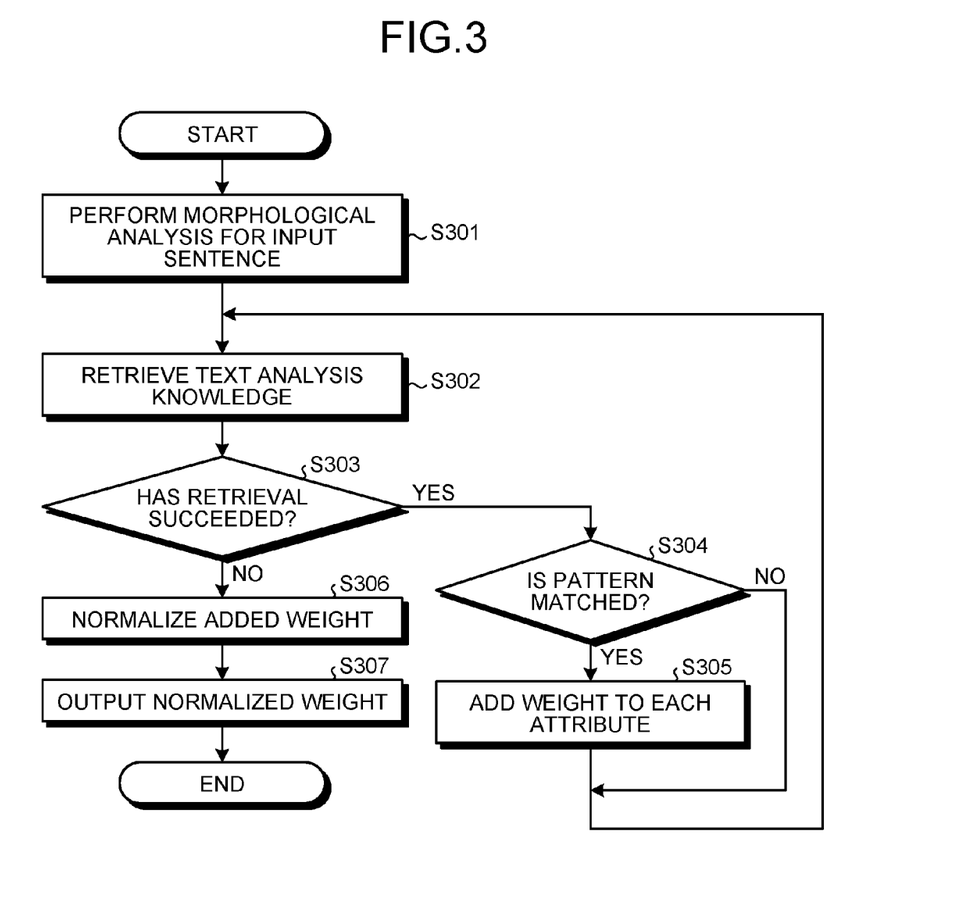
FIG. 3 is a flow diagram illustrating a flow of a text analysis process according to the embodiment.

The sentence input by the user is accepted by the acceptance unit 101, and then sent to the analysis unit 102. Next, the analysis unit 102, according to a flow in FIG. 3, analyzes the input sentence while referring to the text analysis knowledge stored in the analysis knowledge storage unit 103. Specifically, as illustrated in FIG. 3, the analysis unit 102 first performs morphological analysis for the input sentence (step S301). The morphological analysis is a process to divide the sentence into words and assign a part of speech to each word. Since the morphological analysis can be realized by a known method, detailed explanation will not be provided herein. The following is an exemplary result of the morphological analysis.

"Hanako <person's name (first name)>+wa <postposition>/konzatsu <noun>+o <postposition>/sake <verb>/shoten <noun>+no <postposition>/oku <noun>+de <postposition>/mat <verb>+to <auxiliary verb>/. <period>(omitted) Mioboe <noun>+no <postposition>/aru <verb>/hon <noun>+dearu <auxiliary verb>/. <period>"

In this example, "<xx>" denotes the part of speech, "+" denotes a pause between words, and "/" denotes a pause between phrases. Among the parts of speech, "person's name (first name)" denotes a first name from a full name of a person's name (proper noun), and the others denote the respective parts of speech as described above.

Figure 4:
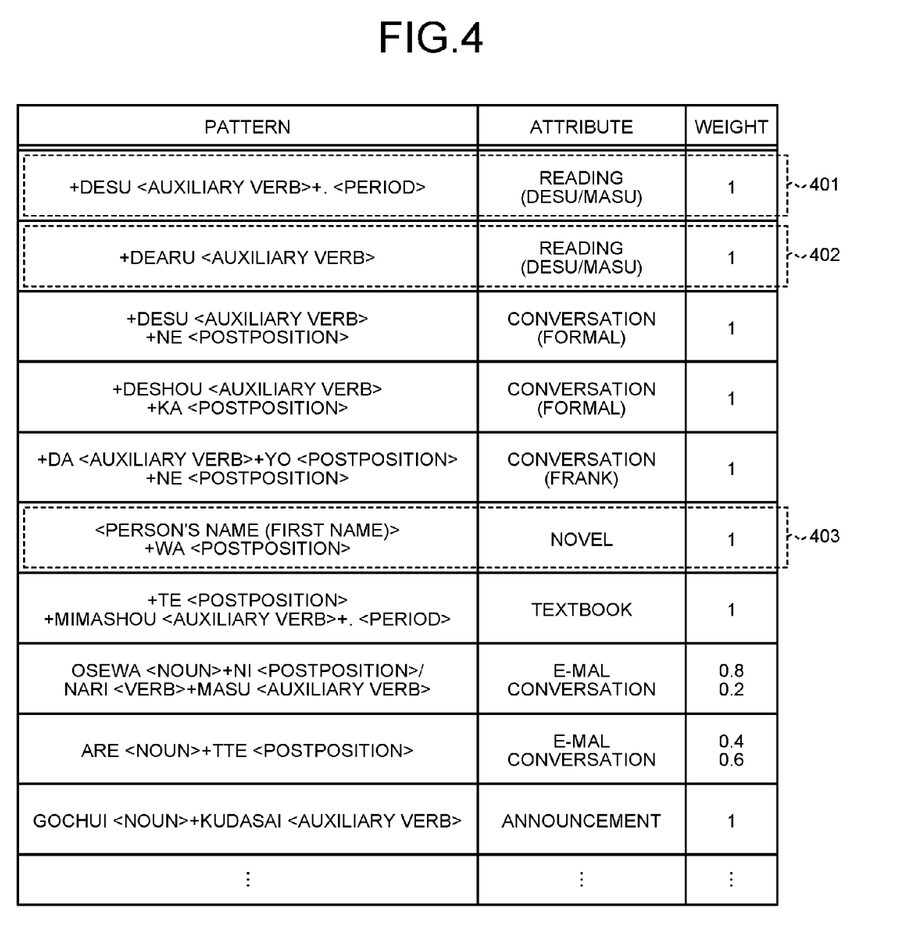
FIG. 4 is a diagram illustrating exemplary text analysis knowledge according to the embodiment.

Next, the analysis unit 102 retrieves pieces of the text analysis knowledge one by one from the analysis knowledge storage unit 103 (step S302). FIG. 4 is a diagram illustrating exemplary text analysis knowledge. The text analysis knowledge includes three values, i.e. pattern, attribute, and weight. Among them, the "pattern" is represented in the same way as the above-mentioned result of the morphological analysis process, and compared, in a later process (step S304), with a result of the morphological analysis for the input sentence. The "attribute" indicates a corresponding attribute among the voice attributes. The "weight" indicates a score to be added to the corresponding attribute in a later process (step S305) when the pattern is matched.

For example, it is illustrated by 401 of FIG. 4 that a score 1 is added to the attribute "reading (desu/masu)" when a part of the result of the morphological analysis for the input sentence coincides with "+desu <auxiliary verb>+. <period>". When a single piece of the text analysis knowledge can be retrieved (step S303: Yes), the analysis unit 102 compares the "pattern" of the retrieved piece of the text analysis knowledge with the result of the morphological analysis for the input sentence to determine whether they coincide with each other (step S304). As the result of the comparison, when the pattern coincides with the result of the morphological analysis (step S304: Yes), the analysis unit 102 adds a value of the "weight" to the "attribute" of the text analysis knowledge (step S305).

When the pattern does not coincide with the result of the morphological analysis (step S304: No), or after step S305, the process returns again to step S302, where the analysis unit 102 retrieves a next piece of the text analysis knowledge from the analysis knowledge storage unit 103. Steps S302 to S305 are repeated in the above-mentioned way. When all the pieces of the text analysis knowledge have been retrieved and there is no other piece of the text analysis knowledge to be newly retrieved (step S303: No), the analysis unit 102 proceeds to step S306 to normalize the added weight (step S306).

According to the classifications of the voice attribute, namely "style" and "form" exemplified in FIG. 2, the normalization is performed so that the sum of the added values in the same classification is equal to 100. In a case where, however, every attribute in the same classification has a value of 0, the normalization is not performed.

For example, in the above-mentioned example of the result of the morphological analysis, since 402 and 403 of FIG. 4 coincide, in step S304, with the result of the morphological analysis, a weight 1 is added to each attribute "reading (desu/masu)" and "novel". In addition, since the "reading (desu/masu)" and the "novel" belong to the different classifications ("style" and "form", respectively), each value is changed to 100 as the result of the normalization in step S306, and output, in step S307, to the evaluation unit 104 along with the input sentence and the result of the morphological analysis for the input sentence.

The text analysis knowledge does not necessarily need to follow the format illustrated in FIG. 4. For example, a correspondence (weight) between an N-gram (pattern) of a morpheme and the attribute may be represented probabilistically. Such text analysis knowledge can be created by, for example, a process to associate a specific sentence with an appropriate attribute by using a means such as a manual operation which is not included in the present embodiment, and to statistically correlate the N-gram included in the sentence with the attribute.

Figure 5:
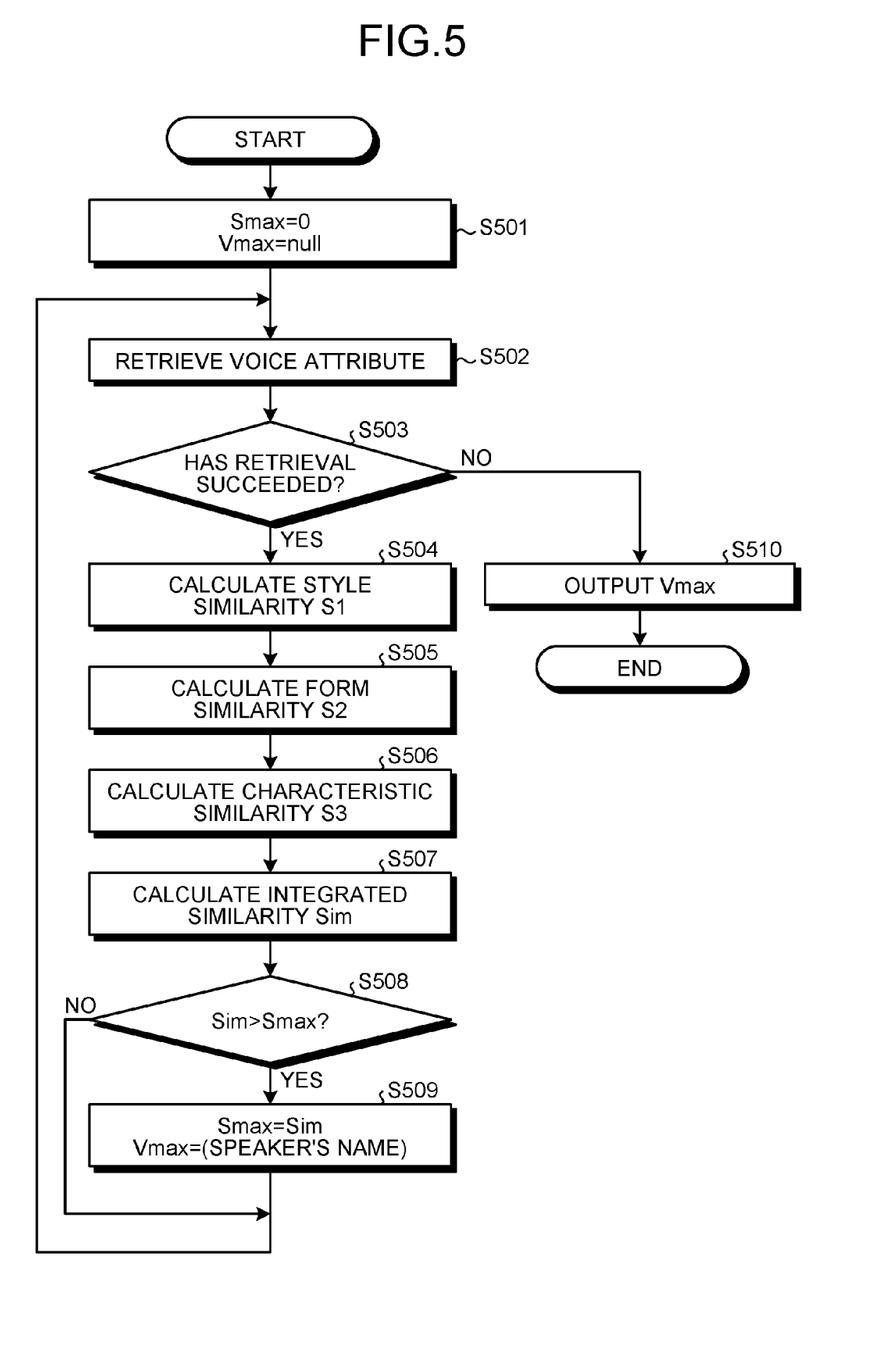
FIG. 5 is a flow diagram illustrating a flow of a process to evaluate similarity of a speaker according to the embodiment.

FIG. 5 is a diagram illustrating a flow of a process where the evaluation unit 104, in response to input from the analysis unit 102, evaluates the voice attribute stored in the voice attribute storage unit 105. First, the evaluation unit 104 initializes Smax and Vmax so that Smax=0 and Vmax =null are satisfied (step S501). Smax is a variable indicating a maximum value of integrated similarity. Vmax is a variable indicating a speaker with the maximum integrated similarity. Next, the evaluation unit 104 retrieves the voice attributes one by one from the voice attribute storage unit 105 (step S502).

The evaluation unit 104 then determines whether the voice attribute has been successfully retrieved (step S503). When the voice attribute has not been successfully retrieved (step S503: No), in other words, when the similarity has been calculated for all of the voice attributes, the evaluation unit 104 outputs Vmax and ends the process (step S510). On the other hand, when the voice attribute has been successfully retrieved (step S503: Yes), the evaluation unit 104 calculates S1, i.e. an inner product of the result of the analysis unit 102 and the value of the "style" of the voice attribute (step S504).

Next, the evaluation unit 104 calculates S2, i.e. an inner product of the result of the analysis unit 102 and the value of the "form" of the voice attribute (step S505). The evaluation unit 104 then calculates S3, i.e. the number of words, among the list of the words in the "characteristic" of the voice attribute, included in the result of the morphological analysis for the input sentence (step S506). For the purpose of normalization, the list of the words may be vectorized to obtain an inner product.

Finally, the evaluation unit 104 calculates the integrated similarity Sim by using a formula: Sim=$\alpha \cdot S1 + \beta \cdot S2 + \gamma \cdot S3$ (step S507). $\alpha$, $\beta$, and $\gamma$ are predetermined parameters that are adjustable depending on how to place importance on the style, form, and characteristic. The evaluation unit 104 then determines whether Sim>Smax is satisfied (step S508). When Sim>Smax is satisfied (step S508: Yes), the evaluation unit 104 updates Smax to store the speaker's name in Vmax (step S509).

For example, when $\alpha=1$, $\beta=1$, and $\gamma=0.1$ are satisfied, the following values are obtained.
speaker A: S1=0.2, S2=0.3, S3=0, Sim=0.5
speaker B: S1=0.4, S2=0.3, S3=1, Sim=0.8
speaker C: S1=0.3, S2=0.0, S3=0, Sim=0.3
speaker D: S1=0.1, S2=0.1, S3=0, Sim=0.2
speaker E: S1=0.2, S2=0.3, S3=1, Sim=0.6
speaker F: S1=0.1, S2=0.1, S3=0, Sim=0.2
In addition, Vmax=speaker B is output.

In the flow of FIG. 5, only a single speaker with a maximum Sim is output. Alternatively, for example, the evaluation unit 104 may output, as candidates, N speakers in descending order of Sim.

In response to the result of the process by the evaluation unit 104, the candidate presentation unit 106 presents, to the user, the speaker which has been evaluated to be suitable for reading the input sentence. At this time, not only the speaker's name but also information such as the gender, age group, and type may be presented with reference to the voice attribute of the speaker.

The candidate presentation unit 106 further sends, to the voice synthesis unit 107, the input sentence from the user and the speaker's name output by the evaluation unit 104. The voice synthesis unit 107 refers to, among the voice dictionaries stored in the voice dictionary storage unit 108, the voice dictionary corresponding to the input speaker's name. The voice synthesis unit 107 then outputs the input sentence in the synthesized voice. In this case, the sentence input by the user is read in the voice dictionary of the speaker B. In a case where the input sentence is longer than a predetermined sentence length, the voice synthesis unit 107 may read only a portion of the input sentence.

The user confirms the output from the candidate presentation unit 106 and the voice synthesis unit 107. The user then inputs, via the selection acceptance unit 109, whether the user selects the presented speaker. When the user selects the speaker, the selection acceptance unit 109 notifies the result output unit 110 that the user has selected the speaker. The result output unit 110 outputs the information of the selected speaker, and instructs the voice synthesis unit 107 to read the sentence input by the user in the voice dictionary of the speaker. The voice synthesis unit 107 then outputs the synthesized voice.

When the user does not select the speaker presented by the candidate presentation unit 106, the selection acceptance unit 109 notifies the evaluation unit 104 that the speaker has not been selected. The evaluation unit 104 again evaluates, in the same way as above, the voice attributes of the speakers except for the speaker which has not been selected, and outputs a next candidate for the speaker to the candidate presentation unit 106. This process is repeated until the speaker output by the candidate presentation unit 106 is selected.

In the case where the evaluation unit 104 outputs N candidates in descending order of Sim, the candidate presentation unit 106 may operate to display a list of these candidates, and the selection acceptance unit 109 may operate to accept the candidate which has been selected by the user from among the N candidates. In this case, instead of reading at one time in the voice dictionaries of the N candidates, the voice synthesis unit 107 may read in order while the candidate presentation unit 106 controls the display so that each of the presented candidates is clearly associated with the corresponding voice. Alternatively, the candidate presentation unit 106 may, in response to an instruction from the user, control the voice synthesis unit 107 to read in the voice dictionary of the designated speaker.

In the above-mentioned voice selection supporting device 1 according to the present embodiment, the input text is automatically analyzed in terms of the style and the form. Then, the speaker having the voice attribute close to the evaluation result obtained by the text analysis is selected and presented to the user. Therefore, the user no longer needs to search for the speaker based on his/her own decision, and is enabled to select the suitable speaker easily.

The first embodiment has referred to the example in which the speaker suitable for reading, in the voice synthesis, the sentence input by the user is presented. In a first variation of the first embodiment, it is possible to perform control so that a speaker unsuitable for reading the input document is hardly selected. Such a variation will be described based on exemplary voice attributes illustrated in FIG. 6.

Figure 6:
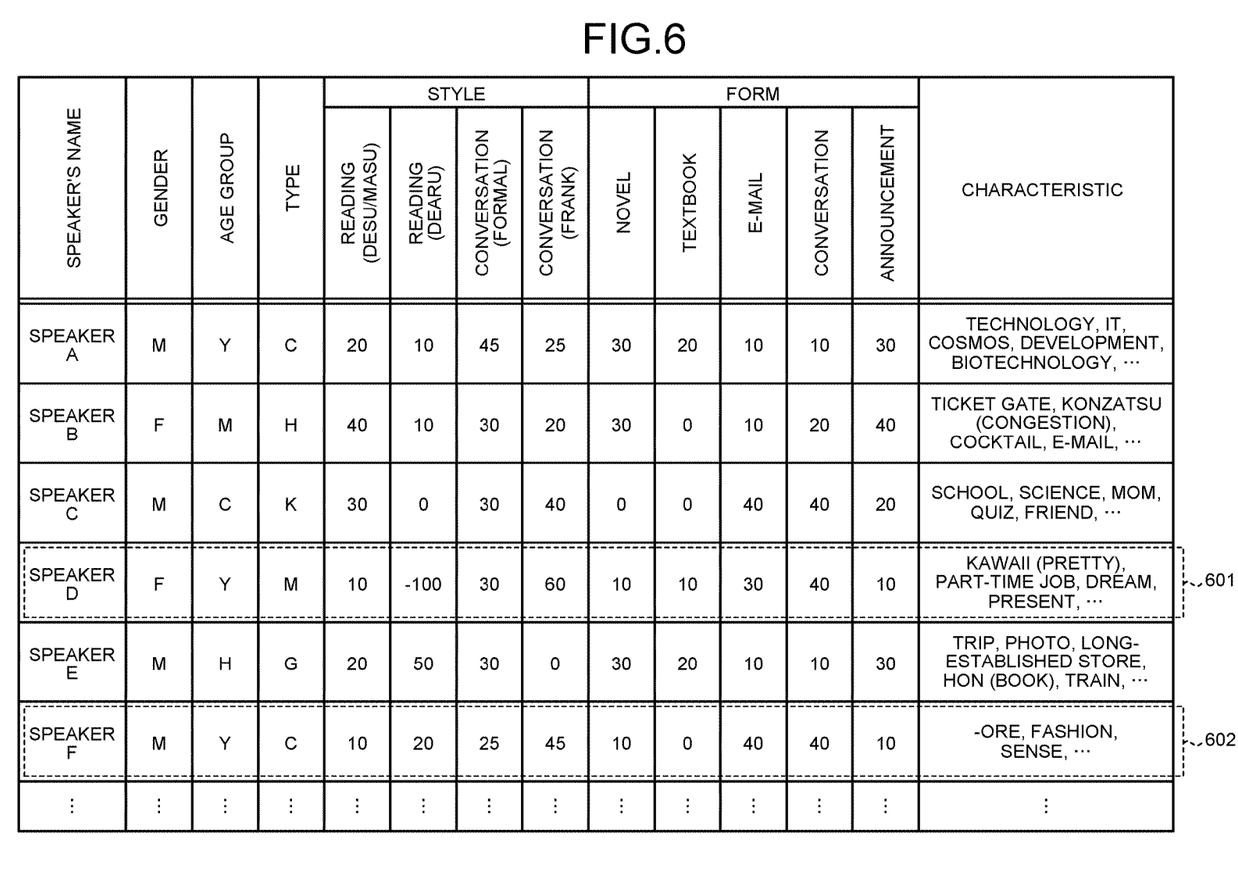
FIG. 6 is a diagram illustrating exemplary voice attributes according to a variation of the embodiment.

Referring to FIG. 6, 601 is an example in which the speaker D characterized by "gender=female, age group=youth, type=moe" is hardly selected for a sentence characterized by "style=reading (dearu)". Specifically, the value of "style=reading (dearu)" is set to "−100" so that the style similarity S1 becomes a negative value for the sentence characterized by "style=reading (dearu)" in the process of the evaluation unit 104. As a result, the speaker D is hardly selected for the sentence characterized by "style=reading (dearu)". At this time, the values in the style except for the value of the reading (dearu) are normalized such that the sum of only the values in the style except for the value of the reading (dearu) is equal to 100.

In addition, 602 of FIG. 6 is an example in which the speaker F characterized by "gender=male, age group=youth, type=cool" is hardly selected for a sentence including a word "ore" ("ore" is an informal pronoun used to refer to one's self in Japanese). The word "ore" is described in the list of the words provided in the "characteristic", with "-" attached to the beginning of the word.

The evaluation unit 104 performs control so that, for example, the value of the characteristic similarity S3 becomes small or negative when the word with "-" attached to its beginning is included in the input sentence. As a result, it is possible to perform control so that such a speaker is hardly selected for the input sentence including such a word.

Furthermore, in addition to the control for making the unsuitable speaker be hardly selected, the evaluation unit 104 may perform control so that the unsuitable speaker would never be presented.

Owing to the first variation, the speaker him/herself can control his/her voice dictionary so as not to be used, for example, for reading a sentence that requires age restriction, is contrary to the public order and morals, or does not fit his/her image.

Figure 7:
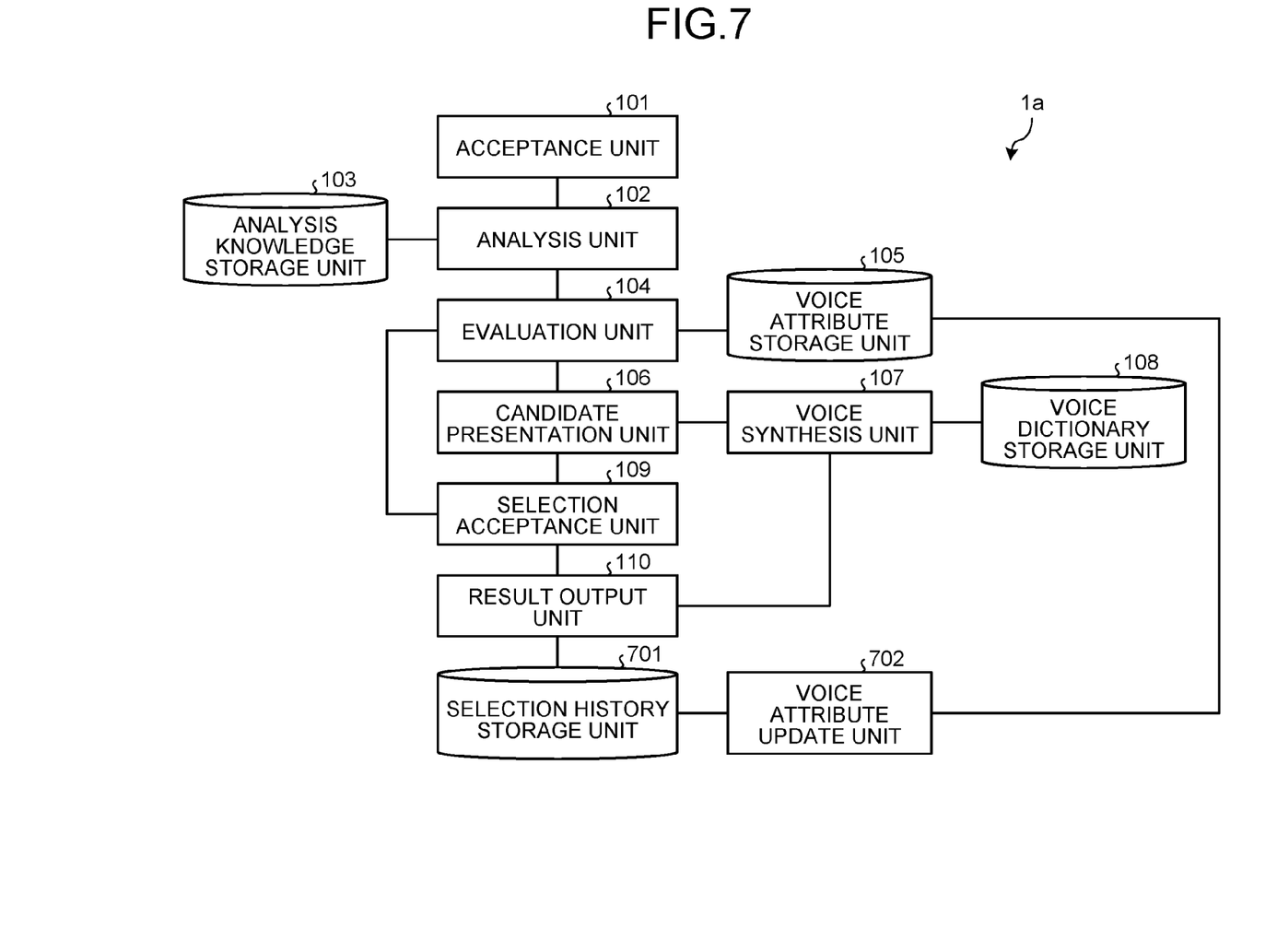
FIG. 7 is a block diagram illustrating a functional configuration of a voice selection supporting device according to a variation of the embodiment.

As another variation of the first embodiment, voice information stored in the voice attribute storage unit 105 can be updated by using the sentence input by the user and the information of the speaker selected by the user. FIG. 7 is a diagram illustrating a functional configuration of a voice selection supporting device 1a according to this variation. As illustrated in FIG. 7, the voice selection supporting device 1a newly includes a selection history storage unit 701 and a voice attribute update unit 702 in addition to the components of FIG. 1. The selection history storage unit 701 receives, from the result output unit 110, the selection result and the input sentence as a selection history, and stores therein the selection history. The voice attribute update unit 702 updates the voice attribute based on the selection history stored in the selection history storage unit 701.

Figure 8:
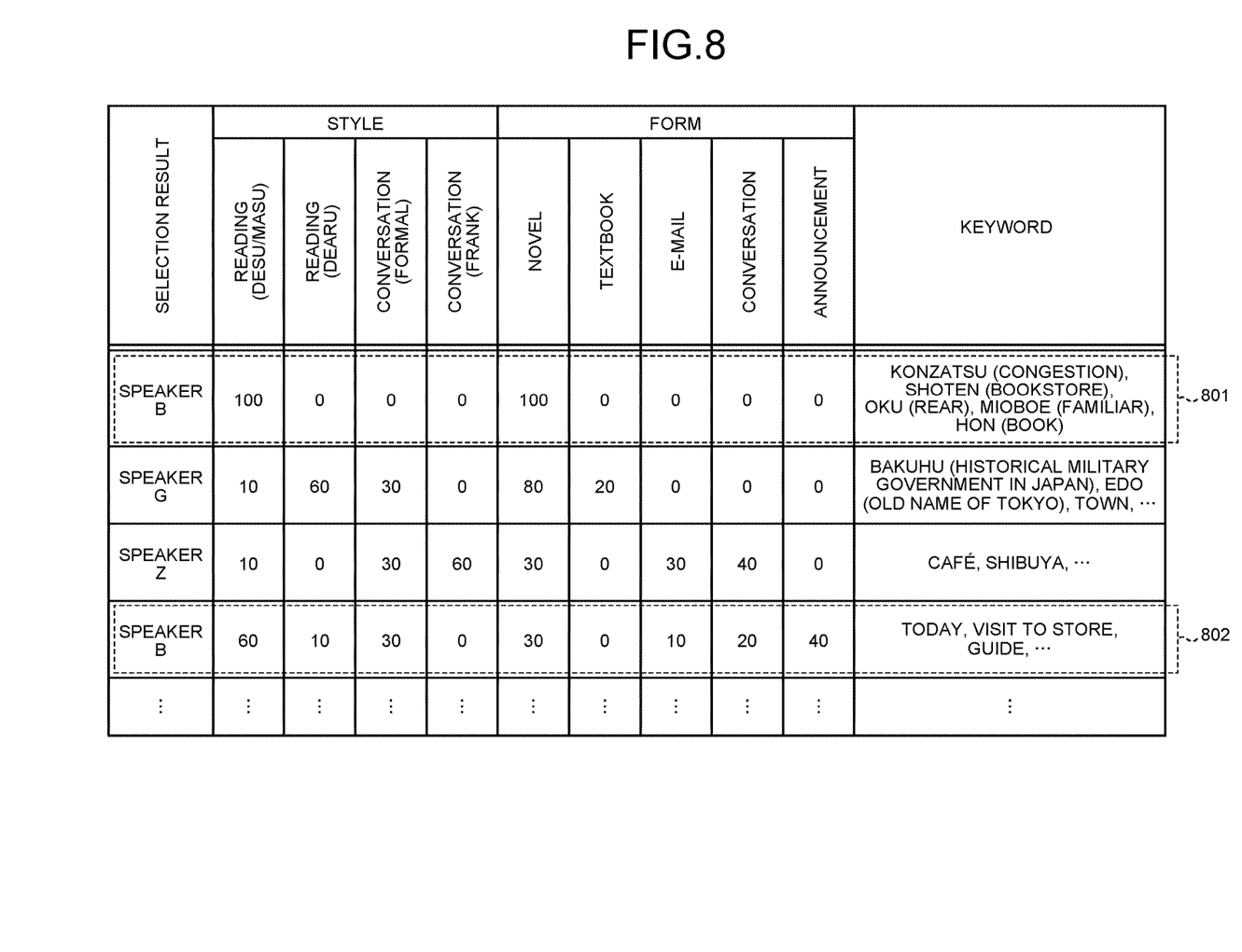
FIG. 8 is a diagram illustrating exemplary speaker selection histories according to a variation of the embodiment.

FIG. 8 is a diagram illustrating exemplary selection histories output from the result output unit 110 and stored in the selection history storage unit 701. The selection histories in FIG. 8 each includes a speaker's name, a normalized weight for each attribute in the style and the form, and keywords. The speaker's name is the selection result of the user received by the selection acceptance unit 109. The normalized weight is obtained by the analysis unit 102 from the sentence input by the user. The keywords are extracted, by the result output unit 110, from among common nouns included in the analysis result obtained by the morphological analysis of the analysis unit 102 for the sentence input by the user. Such keywords are also listed by the result output unit 110. For example, 801 of FIG. 8 is the selection history corresponding to the specific example described in the first embodiment.

In the present variation, only the common nouns included in the analysis result obtained by the morphological analysis of the analysis unit 102 for the sentence input by the user are regarded as the keywords. However, words of other parts of speech such as proper nouns, verbs, and adjectives may also be included in the keywords.

The sentence input by the user might be a long sentence group such as a whole novel. In this case, instead of all the words included in the sentence input by the user, for example, a predetermined number or less of words only may be included in the selection history as the keywords by prioritizing the words according to statistics such as frequency of appearance.

Figure 9:
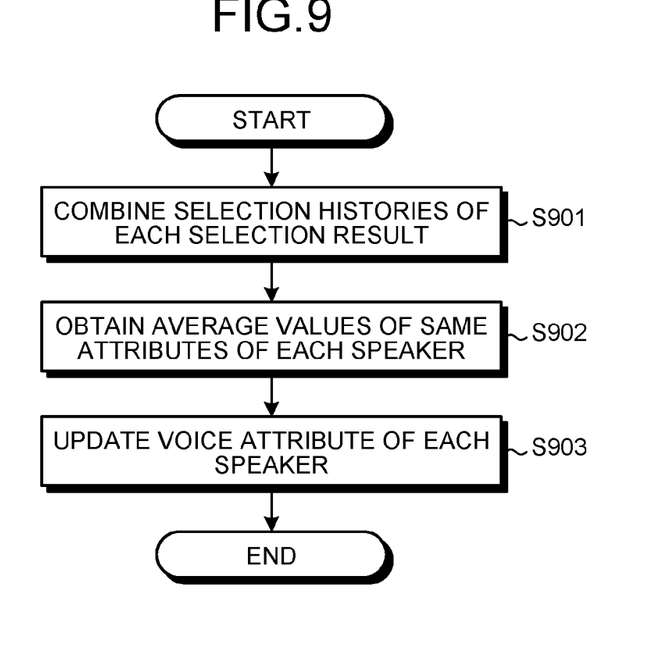
FIG. 9 is a flow diagram illustrating a process to update the voice attribute of the speaker based on selection histories according to the embodiment.

Next, the voice attribute update unit 702 updates the voice attribute stored in the voice attribute storage unit 105 according to a flowchart of FIG. 9. First, the voice attribute update unit 702 combines the selection histories of each selection result (speaker) (step S901). Referring to FIG. 8, for example, 801 and 802 are combined since both are the same speaker B. Next, the voice attribute update unit 702 obtains average values of the same attributes of each speaker (step S902). In the example of the speaker B in FIG. 8, the value of the reading (desu/masu) is 80, the value of the reading (dearu) is 5, the value of the conversation (formal) is 15, the value of the conversation (frank) is 0, the value of the novel is 65, the value of the textbook is 0, the value of the e-mail is 5, the value of the conversation is 10, and the value of the announcement is 20.

The keywords are also brought together. In the example of the speaker B in FIG. 8, the keywords are brought together into "konzatsu (congestion), shoten (bookstore), oku (rear), mioboe (familiar), hon (book), today, visit to store, guide, . . . ". The voice attribute update unit 702 then updates the voice attribute of each speaker (step S903). The voice attribute of the speaker which has been subjected to the combining process in S901 is retrieved from the voice attribute storage unit 105. Each of the average values obtained in S902 is multiplied by a parameter δ and then added to the value of the corresponding attribute. For example, referring to 203 of FIG. 2 corresponding to the speaker B, when the parameter δ=0.1 is assumed, the value of the reading (desu/masu) is 48, the value of the reading (dearu) is 10.5, the value of the conversation (formal) is 31.5, the value of the conversation (frank) is 10, the value of the novel is 36.5, the value of the textbook is 0, the value of the e-mail is 10.5, the value of the conversation is 21, and the value of the announcement is 42. Furthermore, according to the classifications of the voice attribute, namely "style" and "form", the normalization is performed so that the sum of the added values in the same classification is equal to 100.

The value of the parameter δ has been temporarily set herein for explanation purposes. The value of the parameter δ is actually a value to adjust a degree of reflection of the selection history in the voice attribute, and may be set to a value that is much smaller than 0.1. The parameter δ does not need to be a constant, and may be, for example, a function of the number of selection histories. Next, the "keywords" of the selection history brought together in S902 are added to the "characteristic" of the voice attribute.

After the voice attribute is updated, the evaluation unit 104 refers to the voice attribute storage unit 105 to execute the evaluation, whereby the selection history is reflected in the selection of the candidate for the speaker. At this time, speaker selection tendencies (preferences) of the individual users are reflected in the evaluation performed by the evaluation unit 104 when: the selection history storage unit 701 manages the selection histories of the respective users individually; the voice attribute update unit 702 updates the voice attributes based on the individual selection histories of the respective users; and the voice attribute storage unit 105 manages the updated voice attributes for the respective users individually.

On the other hand, in a case where the selection history storage unit 701 collectively manages the selection histories of all the users, a speaker selection tendency of a whole user group is reflected in the evaluation performed by the evaluation unit 104, whereby accuracy of the evaluation performed by the evaluation unit 104 can be expected to be improved.

In the present variation, the voice attribute update unit 702 is configured to update the voice attribute stored in the voice attribute storage unit 105. Alternatively, for example, an operation similar to that of the variation may be realized, without updating the voice attribute stored in the voice attribute storage unit 105, in such a manner that the evaluation unit 104, when executing the evaluation, refers to the selection history stored in the selection history storage unit 701 to reflect the selection history in the evaluation.

Figure 10:
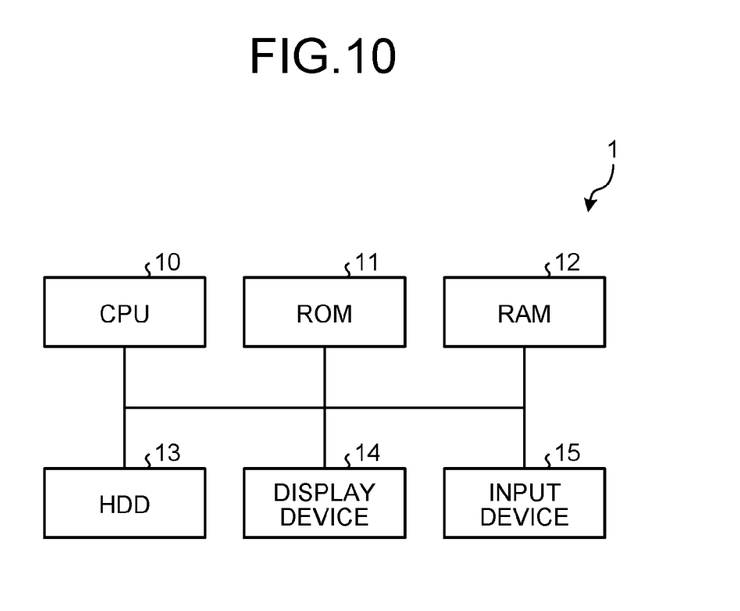
FIG. 10 is a block diagram illustrating a hardware configuration of the voice selection supporting device according to the embodiment.

As illustrated in FIG. 10, the voice selection supporting device 1 according to each of the above-mentioned embodiments includes, for example, a control device such as a CPU 10, a storage device such as a read only memory (ROM) 11 and a RAM 12, an external storage device such as an HDD 13 and a CD drive device, a display device 14 such as a display, and an input device 15 such as a keyboard and a mouse. The voice selection device 1 therefore has a hardware configuration utilizing a typical computer.

A program to be executed in the voice selection supporting device according to each of the above-mentioned embodiments is provided as a file in an installable format or an executable format recorded in a computer-readable recording medium. The computer-readable recording medium includes, for example, a CD-ROM, a flexible disk (FD), a CD-R, and a digital versatile disk (DVD).

The program according to each of the above-mentioned embodiments may be provided so as to be stored in a computer connected to a network such as the Internet and downloaded over the network. The program to be executed in the voice selection device according to each of the above-mentioned embodiments may be provided or distributed over the network such as the Internet.

The program according to each of the above-mentioned embodiments may be provided so as to be embedded in advance in the ROM or the like.

The program to be executed in the voice selection supporting device according to each of the above-mentioned embodiments has a module configuration including the above-mentioned units. Regarding a hardware implementation, the CPU (processor) reads the program from the above-mentioned recording medium to execute the program, whereby each of the above-mentioned units is loaded into and generated on a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice selection supporting device comprising:
    a memory; and
    one or more processors configured to function as an acceptance unit, an analysis unit, an evaluation unit, a candidate presentation unit and a voice synthesis unit, wherein
    the acceptance unit accepts input of a text;
    the analysis unit performs a morphological analysis of the text and obtains an attribute of the text by referring to text analysis knowledge, the text analysis knowledge associating attributes with results of the morphological analysis for texts respectively;
    the evaluation unit evaluates respective similarities between the voice attributes for the voice dictionaries and the obtained attribute of the text, each of the voice attributes indicating voice characteristics of a speaker for a voice synthesis, each of the voice dictionaries corresponding to the speaker for the voice synthesis;
    the candidate presentation unit presents, based on the similarities, a candidate of the speaker from the voice dictionaries suitable for the text; and
    the voice synthesis unit reads the text corresponding to the candidate of the speaker into synthesized voices.

2. The voice selection supporting device according to claim 1, wherein
    the memory is configured to function as a dictionary storage unit; and
    the one or more processors is further configured to function as a voice synthesis unit, a selection acceptance unit and a result output unit,
    the dictionary storage unit stores therein the voice dictionaries;
    the voice synthesis unit converts, based on an instruction from a user, all or a part of the input text into a voice by using the presented candidate of the speaker, and presents the voice to the user;
    the selection acceptance unit accepts a selection instruction for the voice dictionaries from the user; and
    the result output unit that outputs the selection result.

3. The voice selection supporting device according to claim 2, wherein:
    the memory is further configured to function as a history storage unit; and the one or more processors are further configured to function as an update unit, the history storage unit stores therein, as a selection history, the selection result received from the result output unit and the text; and the update unit updates the voice attribute for the voice dictionaries based on the selection history stored in the history storage unit.

4. The voice selection supporting device according to claim 1, wherein

The memory is further configured to function as a voice attribute storage unit; and the voice attribute storage unit stores therein the voice attributes for the voice dictionaries in descending order of the similarities with respect to the text.

5. A voice selection method employed in a voice selection supporting device comprising the steps of:

accepting input of a text;

performing a morphological analysis of the text and obtaining an attribute of the text by referring to text analysis knowledge, the text analysis knowledge associating attributes with results of the morphological analysis for texts respectively;

evaluating respective similarities between voice attributes for voice dictionaries and the obtained attribute of the text, each of the voice attributes indicating voice characteristics of a speaker for a voice synthesis, each of the voice dictionaries corresponding to the speaker for the voice synthesis;

presenting, based on the similarities, a candidate of the speaker from the voice dictionaries suitable for the text; and reading the text corresponding to the candidate of the speaker into synthesized voices.

6. A non-transitory computer-readable recording medium that stores therein a computer program, the computer program causing a computer to execute a voice selection method, the method comprising:

accepting input of a text;

performing a morphological analysis of the text and obtaining an attribute of the text by referring to text analysis knowledge, the text analysis knowledge associating attributes with results of the morphological analysis for texts respectively;

evaluating respective similarities between voice attributes for voice dictionaries and the obtained attribute of the text, each of the voice attributes indicating voice characteristics of a speaker for a voice synthesis, each of the voice dictionaries corresponding to the speaker for the voice synthesis;

presenting, based on the similarities, a candidate of the speaker from the voice dictionaries suitable for the text; and reading the text corresponding to the candidate of the speaker into synthesized voices.

* * * * *